April 6, 1926. 1,580,092
H. W. STUVER
PISTON RING
Filed May 29, 1923
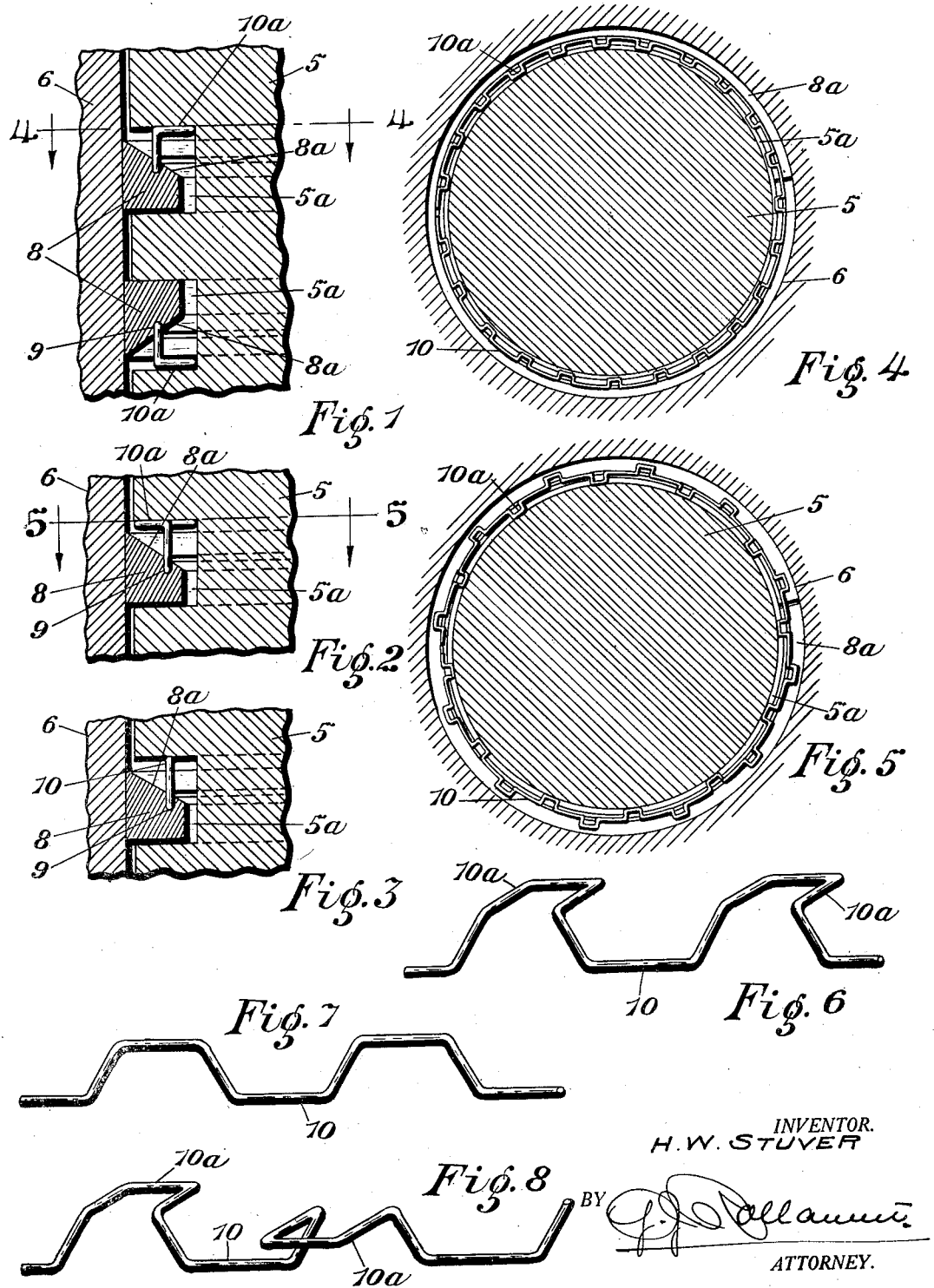

Patented Apr. 6, 1926.

1,580,092

UNITED STATES PATENT OFFICE.

HENRY W. STUVER, OF DENVER, COLORADO.

PISTON RING.

Application filed May 29, 1923. Serial No. 642,166.

*To all whom it may concern:*

Be it known that I, HENRY W. STUVER, a citizen of the United States, residing at Denver, in the county of Denver and State of Colorado, have invented certain new and useful Improvements in Piston Rings, of which the following is a specification.

This invention relates to piston rings and its principal object is to provide a spring-pressed ring of simple construction which by constant fluid tight engagement with both the cylindrical surface of the piston chamber and a side of the piston groove will effectively prevent leakage of either gases or liquids in the operation of the engine of which the piston is a part.

Another object of the invention is to provide an improved means for maintaining an impervious contact of the ring with the engaged surfaces by the pressure of fluids used in the operation of the engine.

With the above and other objects in view, my invention consists in the construction, combination and arrangement of parts as will hereinafter be fully described with reference to the accompanying drawings.

In the drawings in which like characters of reference designate corresponding parts throughout the several views, Figure 1 represents a fragmentary longitudinal section of the adjoining portions of a piston and the wall of a piston chamber in which it operates, showing my improved packing ring in its operative position;
Figures 2 and 3, similar sections showing modifications in the construction of the spring member which acts upon the piston ring to yieldingly maintain it in its effective position;
Figure 4, a transverse section of the piston and the wall of its chamber, taken on the line 4—4, Figure 1, and drawn to a reduced scale;

Figure 5, a similar section along the line 5—5, Figure 2;

Figure 6, a fragmentary perspective view of a spring of the construction shown in Figure 1;

Figure 7, an elevation of a portion of a spring of the form illustrated in Figure 3; and Figure 8, a perspective view of a portion of a spring of the construction shown in Figure 2.

Referring more specifically to the drawings, the reference numeral 5 designates a piston fitted for reciprocation in a cylindrical chamber the wall of which is shown at 6.

The piston has as usual a plurality of circumferential grooves 5ª to seat the piston rings which frictionally engage the inner surface of the chamber and in this respect the construction does not differ from that of other pistons at present in general use.

My invention resides particularly in the form of the piston ring and the resilient means which yieldingly maintain it in its operative position.

The ring 8 is of the transversely split type which by the inherent resiliency of the metal of which it is composed, maintains its frictional contact with the wall of the piston chamber.

It is an important and essential feature of the present invention that the ring is proportioned in cross-sectional area so that it occupies but a portion of the piston groove in which it is disposed and is constantly in widely spaced relation to the circumferential face of the groove and to the side face of the same nearest the end of the piston in which the groove is formed.

The face 8ª of the ring opposite the last mentioned face of the piston is beveled to provide a sloping plane from the circumferential wall of the piston chamber to the space behind the ring in the groove of the piston.

The ring has in its beveled surface a depressed groove-shaped seat 9 for a spring adapted to cause its opposite surface to maintain an impervious contact with the side face of the groove with which it engages.

The spring 10 in its simplest form illustrated in Figures 3 and 7, is composed of spring wire bent in sinuous or zig-zag form. The spring is curved in conformity with the circle of the seat in the piston ring and the apexes of its alternating turns extend rectilinearly in the direction of the length of the spring to firmly engage with the seat and the thereto opposite surface of the piston groove.

The spring inserted under compression in the groove of the ring as shown in Figure 3, extends in practice perpendicular to the side of the piston groove engaged by the ring, and by the tendency of its turns to reassume their normal form, it maintains the ring in impervious contact with the piston.

In this connection, I desire it understood that it is not the purpose of my invention to provide a spring functioning to press the ring against the surface of the cylinder wall but that I rely principally upon the inherent resiliency of the ring and the fluid pressure to which it is exposed to maintain its impervious contact with the wall under all conditions.

In the form of the invention illustrated in Figures 1, 4 and 6, the spring 10 has at the ends of its turns which in practice engage with the side of the piston-groove, laterally extending wings 10ª which aid in holding the spring in its operative position relative to the piston ring, and in the modification shown in Figures 2, 5 and 8, the wings are bent alternately in opposite directions for the same purpose.

In the operation of my invention, the ring held in close contact with one side of the piston groove by the pressure of its spring, frictionally engages the wall of the piston chamber at its inner circumference and its beveled and outer circumferential faces are widely spaced from the corresponding sides of the groove for the admission of pressure fluid.

The beveled surface of the ring provides a ready approach for the fluid to the inner part of the piston groove behind the ring and it furthermore causes the pressure of the fluid to be directed toward the points of contact of the ring with the piston and the wall of the piston chamber.

It is preferred to reverse the position of the ring and the spring at the compression end of the piston from that at the opposite or crank case end of the same as illustrated in Figure 1 so that during the reciprocating movement of the piston, the leakage of fluid from the space at either end of the piston to that at the opposite end of the same, is positively prevented.

It will be apparent that the pressure of the spring at right angles to the face of the ring engaging the piston in the groove thereof, the inherent resiliency of the ring, and the fluid pressure upon the outer circumferential and beveled surfaces of the ring cooperate to eliminate leakage of either oil or gaseous fuel past the piston in either direction.

Having thus described my invention, what I claim and desire to secure by Letters Patent is:

1. As a new article of manufacture, a piston ring having a slanting face between its inner and outer circumferences and having a spring seat in said face, and a sinuous spring in said seat at substantially right angles to the plane of the ring.

2. As a new article of manufacture, a piston ring having a circular seat, and a sinuous spring in said seat, the apexes of the turns at a side of which have lateral wings.

3. As a new article of manufacture a piston ring having a circular seat, and a sinuous spring in said seat, the apexes of the turns at a side of which have lateral wings extending alternately in opposite directions.

4. The combination with a piston-chamber and a reciprocating circumferentially grooved piston therein, of an expansible ring having an outer face engaging the wall of the chamber, a second face at right angles to the other, engaging a side of the piston groove, and a third face slanting from a point in the chamber wall opposite to the opening of the groove, to a point in the fourth side of the ring spaced from the inner face of the groove whereby to provide a gradually widening passage for fluid from the clearance between the chamber wall and the piston, into the piston groove, and a sinuous spring between the slanting face of the ring and the side of the groove to which said face is opposite, having an expansive movement in a direction at substantially right angles to the plane of the ring.

5. The combination with a piston-chamber and a reciprocating circumferentially grooved piston therein, of an expansible ring having an outer face engaging the wall of the chamber, a second face at right angles to the other, engaging a side of the piston groove, and a third face slanting from a point in the chamber wall opposite to the opening of the groove, to a point in the fourth side of the ring spaced from the inner face of the groove whereby to provide a gradually widening passage for fluid from the clearance between the chamber wall and the piston, into the piston groove, and a sinuous spring between the slanting face of the ring and the side of the groove to which said face is opposite.

In testimony whereof I have affixed my signature.

HENRY W. STUVER.